United States Patent
Ishibashi et al.

(10) Patent No.: US 10,768,007 B2
(45) Date of Patent: Sep. 8, 2020

(54) IMAGE DISPLAY DEVICE

(71) Applicant: TOYOTA JIDOSHA KABUSHIKI KAISHA, Toyota-shi, Aichi-ken (JP)

(72) Inventors: Masahisa Ishibashi, Nisshin (JP); Yasutaka Yoshimura, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 19 days.

(21) Appl. No.: 15/414,016

(22) Filed: Jan. 24, 2017

(65) Prior Publication Data
US 2017/0277383 A1    Sep. 28, 2017

(30) Foreign Application Priority Data

Mar. 23, 2016 (JP) .................................. 2016-058317

(51) Int. Cl.
*G01C 21/36* (2006.01)
*G06F 3/0489* (2013.01)

(52) U.S. Cl.
CPC ..... *G01C 21/3605* (2013.01); *G01C 21/3667* (2013.01); *G01C 21/3676* (2013.01); *G06F 3/04895* (2013.01)

(58) Field of Classification Search
CPC ............ G01C 21/3605; G01C 21/3667; G01C 21/3676; G06T 5/001; G06F 3/04895
See application file for complete search history.

(56) References Cited

U.S. PATENT DOCUMENTS

| | | | | |
|---|---|---|---|---|
| 2006/0153456 A1* | 7/2006 | Foote | .................... | G06F 16/583 382/190 |
| 2012/0109516 A1* | 5/2012 | Miyazaki | ............. | G01C 21/367 701/428 |
| 2013/0304366 A1* | 11/2013 | Jung | ...................... | H04L 67/22 701/117 |
| 2016/0110094 A1* | 4/2016 | Kim | ..................... | G06F 3/0484 715/846 |
| 2017/0024106 A1* | 1/2017 | Wild | .................... | G06F 3/0482 |

FOREIGN PATENT DOCUMENTS

| | | |
|---|---|---|
| CN | 102449435 A | 5/2012 |
| JP | 2014-203318 A | 10/2014 |

* cited by examiner

*Primary Examiner* — Sahlu Okebato
(74) *Attorney, Agent, or Firm* — Oliff PLC

(57) ABSTRACT

A display in an image display device displays images. A processor generates an image for display on the display. A map provider provides a map image to the processor. An image provider provides a display image associated with a type of a function item. An acknowledging unit acknowledges a user input. When the acknowledging unit acknowledges an input to display the function item, the processor causes the display to display the map image and the display image associated with the user input. When the display image for a predetermined function item is displayed, the processor displays the map image in a blurred manner.

6 Claims, 3 Drawing Sheets

IMAGE DISPLAY DEVICE

BACKGROUND

1. Technical Field

The present disclosure relates to image display devices provided in a vehicle and capable of displaying map images.

2. Background

An image display device capable of displaying a map image showing the position of the driver's vehicle is provided in a vehicle. Patent document 1 discloses a display information generator that generates information for display on an on-vehicle display. The display information generator as disclosed displays the position of the driver's vehicle and roads. As the vehicle speed increases, the display information generator generates information for displaying nearby roads other than the road that the driver's vehicle is traveling on in a blurred manner. The display information generator is also provided with a telephone function and generates information for displaying nearby roads in a blurred manner when an incoming call is received.

[patent document 1] JP2014-203318

When a user attempts to use a function other than the map display function, the user can use the map display function along with said other function by configuring the image display device to display a map image while also displaying a display image for said other function. If said other function is a function to set a destination of travel, however, the user intends to update map image information in accordance with a user operation to set a destination and so may not use the map image information currently displayed. During a user operation, the user may be disturbed by the map image displayed. It is sometimes preferable that the display image for said other function be made relatively more viewable than the map image.

SUMMARY

The embodiments address the above-described issues, and a general purpose thereof is to provide a technology that allows an image display device to display a map image and a display image for another function at the same time, and to configure the viewability of the map image appropriately in accordance with the type of the other function.

An image display device according to one embodiment comprises: a display configured to display images; a processor configured to generate an image for display on the display; a map provider configured to provide a map image to the processor; an image provider configured to provide a display image associated with a type of a function item; and an receiver configured to acknowledge a user input. The image provider configured to provide the processor with a destination setting image for setting a destination. When the receiver acknowledges an input to display the function item, the processor causes the display to display the map image and the display image associated with the user input, and, when the receiver acknowledges an input to display the function item for setting a destination, the processor causes the display to display the destination setting image as the display image and display the map image in a blurred manner, and, when the receiver acknowledges an input to display the function item different from the function item for setting a destination, the processor causes the display to display the display image and display the map image without blurring the map image.

According to this embodiment, by causing the processor to display the map image and the display image, the function item associated with the user input is displayed and, at the same time, the user can recognize that the map display function remains in operation. When the processor displays a function item for setting a destination in accordance with a user input, the user can easily recognize a destination setting image that is relatively clear, by causing the processor to display the map image in a blurred manner. Meanwhile, when the processor displays another function item associated with a user input, the processor displays the map image that is not blurred, thereby allowing the user to continue to use the map display function and also use the other function indicated by the display image. Thus, viewability of the display image and usability are improved by causing the processor to activate or deactivate the process of blurring the map image depending on the type of function item.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Various embodiments now will be described. The embodiments are intended to be illustrative, not limiting.

Figure 1:
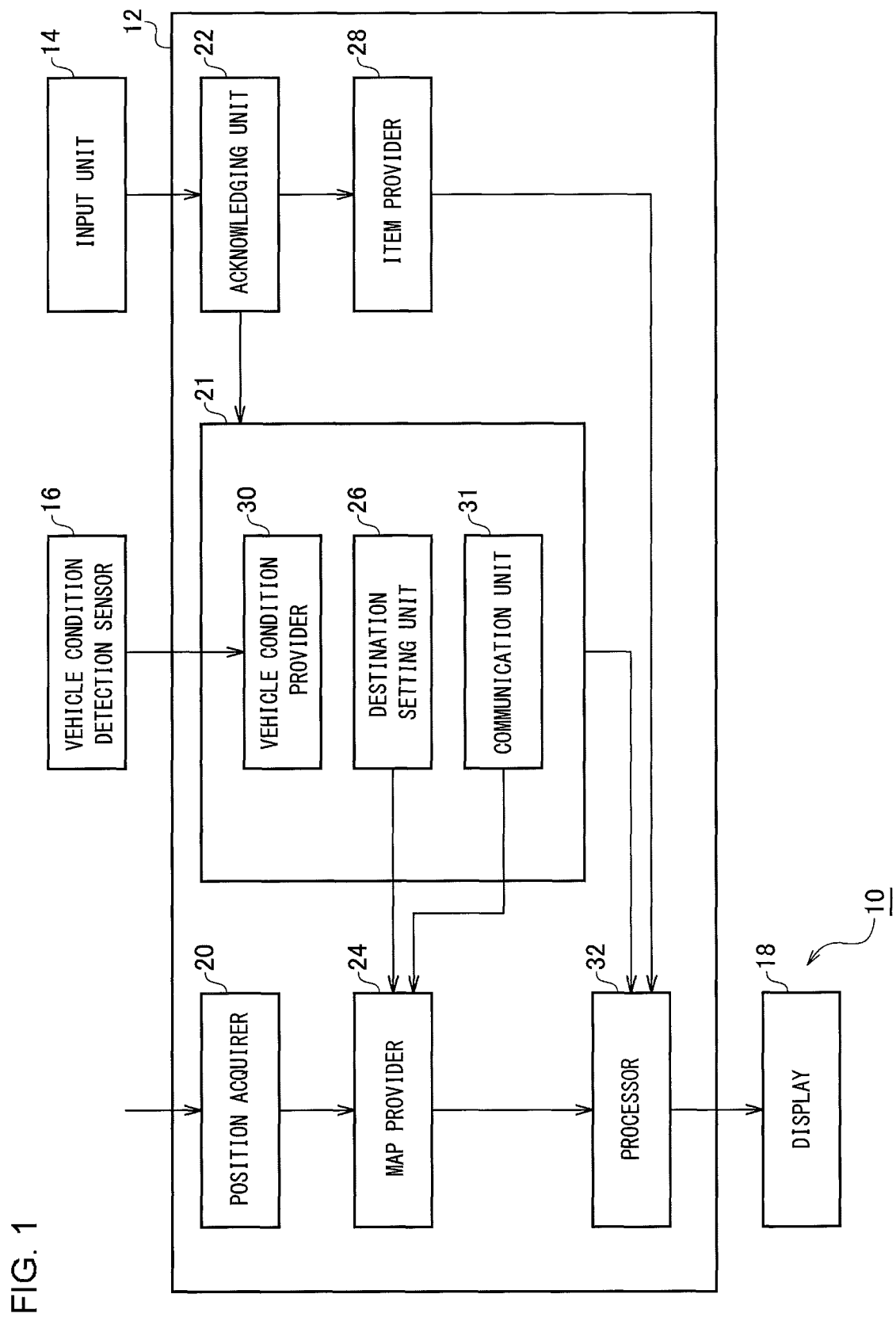
FIG. 1 is a diagram showing the functional configuration of an image display device.

FIG. 1 is a diagram showing the functional configuration of an image display device 10. The image display device 10 is mounted on a vehicle. For example, a display 18 is provided in a dashboard located between the driver's seat and the front passenger seat. The image display device 10 generates a map image showing the position of the driver's vehicle as part of the navigation function. The image display device 10 also acknowledges a user input and allows the user to use on-vehicle functions.

The image display device 10 includes a controller 12, an input unit 14, and a display 18. The controller 12 is implemented in hardware such as devices and mechanical components such as a CPU and a memory of a computer, and in software such as a computer program.

The display 18 displays an image delivered from the controller 12. The display 18 is a touch-sensitive panel display configured to detect the contact of a user's finger. The input unit 14 is a means for receiving a user operation and is implemented by an icon displayed on the display 18 or a mechanical control switch.

The controller 12 includes a position acquirer 20, an acknowledging unit 22, a map provider 24, an item provider 28, and a processor 32.

The position acquirer 20 acquires the position of the driver's vehicle by using a Global Positioning System (GPS). The position acquirer 20 may derive the position of the driver's vehicle based on time information from multiple satellites.

The map provider 24 provides the processor 32 with a map image for display on the display 18. The map provider 24 receives position information on the driver's vehicle from the position acquirer 20 and provides a map image showing the position of the driver's vehicle to the processor 32, adding a symbol indicating the position of the driver's vehicle to the map image.

The acknowledging unit 22 acknowledges a user input from the input unit 14. When the acknowledging unit 22 acknowledges an input to display a menu icon, the item provider 28 provides the menu icon to the processor 32. A menu icon is an object that can be used by the user to select a function and is displayed in part in a predetermined area on the display 18. Multiple menu icons associated with different function types are displayed. For example, an icon for making a transition to a screen for setting a destination, an icon for displaying vehicle condition information, an icon for connecting to a network to receive a predetermined service, etc. are displayed. When the user touches one of the menu icons with a finger, the function of the item associated with the user input is executed. Thus, the user can select a desired function from the menu icons and use the selected function accordingly.

The image provider 21 provides a display image associated with the type of a predetermined function item to the processor 32. The image provider 21 includes a vehicle condition provider 30, a destination setting unit 26, and a communication unit 31. For example, when the user touches a menu icon for setting a destination, the destination setting unit 26 provides a destination setting image for setting a destination to the processor 32. When the user touches a menu icon for displaying vehicle condition information, the vehicle condition provider 30 provides a vehicle condition information image to the processor 32. Thus, the image provider 21 provides the processor 32 with a display image indicating a function associated with a user input.

The destination setting unit 26 sets a destination based on the user input and delivers the destination thus set to the map provider 24. When the map provider 24 receives the destination thus set from the destination setting unit 26, the map provider 24 adds information for guidance of a route to the destination to the map image. For example, the map provider 24 distinguishes the route to the destination from the other roads in the map image, showing the road to the destination in a larger size than the other roads and coloring the road to the destination differently. In the destination setting function, the user is expected to provide complicated user operation inputs such as entering an address or phone number of the destination.

The vehicle condition provider 30 provides the processor 32 with a vehicle condition information image showing the vehicle condition information received from a vehicle condition detection sensor 16. Further, the vehicle condition provider 30 may receive vehicle condition information from an on-vehicle ECU. The vehicle condition information includes a vehicle speed, travel distance, battery level of the on-vehicle battery, images captured around the vehicle, intra-vehicle temperature, etc.

The communication unit 31 connects to a network such as Internet and provides the processor 32 with an interface image for using the network. The communication unit 31 may connect to the network using the communication function of a cellular phone or connect to the network using a dedicated communication device. For example, the user can update the map information or acquire traffic jam information by using the function of the communication unit 31.

The processor 32 generates an image for display on the display 18 and delivers the generated image to the display 18. The processor 32 displays the map image showing the position of the driver's vehicle received from the map provider 24 so as to display a map around the driver's vehicle. When the acknowledging unit 22 acknowledges an input to display the menu icons, the processor 32 displays the menu icons received from the item provider 28.

When the acknowledging unit 22 acknowledges an input to display any of function items, i.e., when the user touches any of the menu icons, the processor 32 causes the display 18 to display a map image and a display image associated with the user input. When displaying a display image for a function item for setting a destination, the processor 32 displays the map image in a blurred manner. By causing the display 18 to display a map image and a display image associated with the user input, the map display function can remain in operation and, at the same time, the display image indicating the other function is displayed as an inserted image. By blurring the map image, the user can easily recognize the display image that is relatively clear. When the map image is not blurred, the user can continue to use the map display function.

More specifically, when the acknowledging unit 22 acknowledges an input to display a function item for setting a destination, the processor 32 causes the display 18 to display a destination setting image and a blurred map image. When the acknowledging unit 22 acknowledges an input to display another function item (e.g., a function item for displaying vehicle condition information), the processor 32 causes the display 18 to display vehicle condition information and a map image that is not blurred. The processor 32 displays the map image along with the display image without blurring the map image except when displaying a destination setting image. This improves the viewability of the destination setting image for the user attempting to set a destination and allows the display 18 to use both the map display function and vehicle condition information display function to display vehicle condition information. When the destination setting image is displayed, the user intends to update the map image information according to a user operation for setting. For this purpose, the viewability of the destination setting image in which the blurred map image is inserted is improved. When the user does not intend to update the map image information such as when using the vehicle condition information display function, on the other hand, the map image is not blurred so that the user can use both functions.

A description will be given of a process of blurring a map image. The processor 32 blurs a map image by averaging pixel values of adjacent pixels in the map image. In one variation of the blurring process, the processor 32 may derive an average of 5×5 pixels, i.e., a set of pixels within a range of 5 pixels in the vertical and horizontal directions. Alternatively, the processor 32 may average a set of 10×10 pixels in the vertical and horizontal directions. In accordance with the variation of the blurring process, the processor 32 may total the pixel values of adjacent pixels and distributes the pixel values in a certain ratio. In further accordance with the variation of the blurring process, the processor 32 may average the pixel values of adjacent pixels if a difference between the pixel values of the adjacent pixels is equal to or more than a predetermined threshold value (e.g., if a difference in any of the RGB values is equal to more than the threshold value).

Figure 2A:
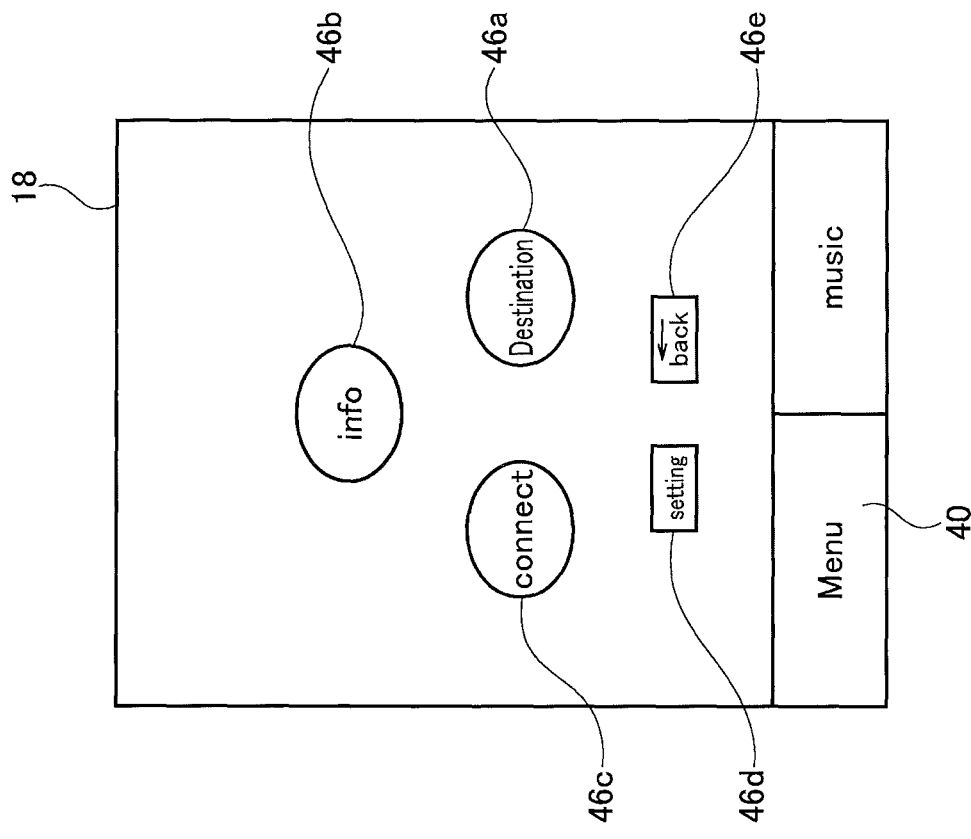
FIG. 2A shows a display displaying a map image.
Figure 2B:
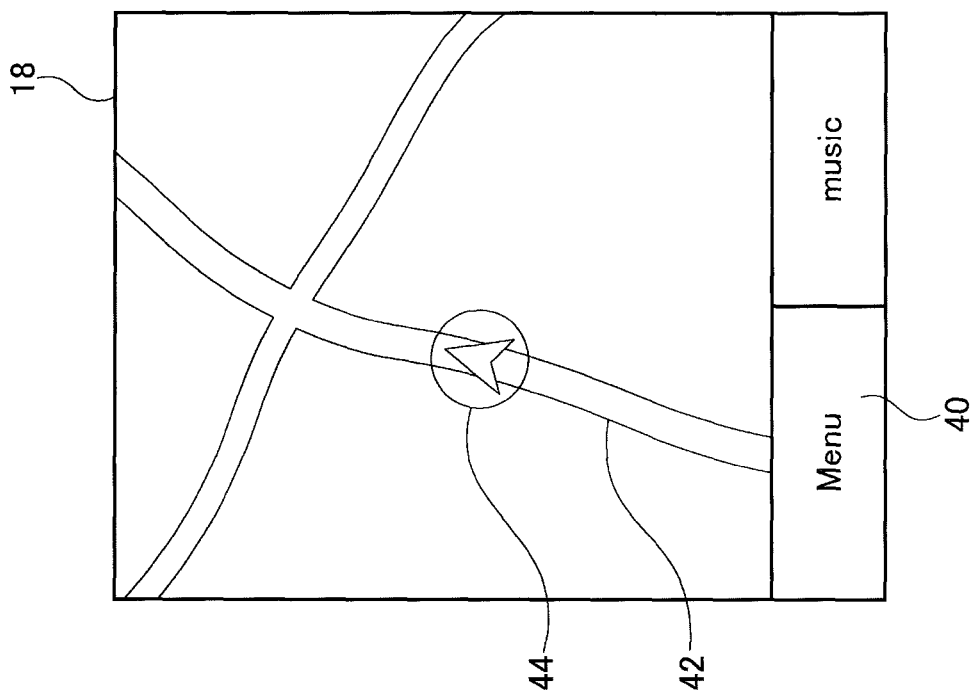
FIG. 2B shows the display 18 displaying menu icons.

FIG. 2A shows the display 18 displaying a map image 42, and FIG. 2B shows the display 18 displaying menu icons 46. The display 18 is formed such that the longitudinal dimension thereof is larger than the horizontal dimension thereof.

The map image 42 shown in FIG. 2A is a map around the driver's vehicle. A driver's vehicle symbol 44 is shown near the center of the display 18 to indicate the position of the driver's vehicle. A menu display icon 40 is located in the bottom left corner of the display 18. When the user taps the menu display icon 40 with a finger, the acknowledging unit 22 acknowledges an input to display the menu icons and displays the menu icons accordingly. The image display device 10 may be provided with a mechanical menu display switch.

FIG. 2B shows the display 18 displaying the menu icons. When the menu display icon 40 is tapped and the acknowledging unit 22 acknowledges an input to display the menu icons accordingly, the item provider 28 provides the menu icons to the processor 32. The processor 32 delivers images of the menu icons to the display 18. The display 18 displays the images received from the processor 32.

The display 18 displays menu icons 46a, 46b, 46c, 46d, and 46e (referred to as "menu icons 46" if the icons are not distinguished from each other). The menu icon 46a is an icon to display a screen for setting a destination. The menu icon 46b is an icon to display vehicle condition information. The menu icon 46c is an icon to acquire latest road information by connecting to a network. The menu icon 46d is an icon to set the functions of the image display device 10. The menu icon 46e is an icon to return to the original map image 42. When the user taps one of the menu icons 46, the function associated with the type of the menu icon 46 is launched.

A description will be given, with reference to additional drawings, of images displayed by the display 18 when the user touches the menu icon 46a and when the user touches the menu icon 46b.

Figure 3B:
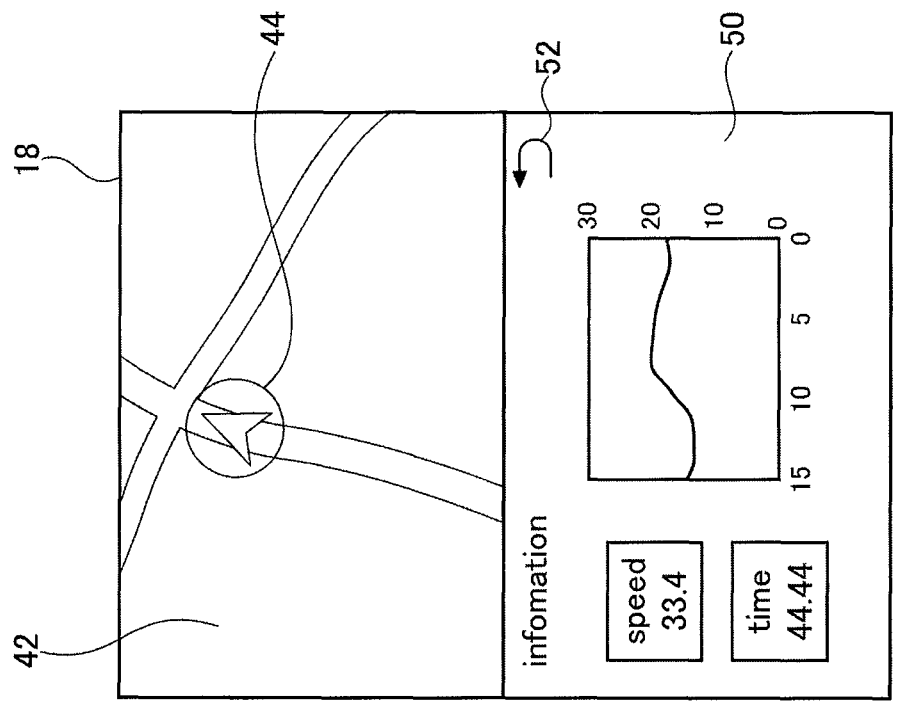
FIG. 3B shows the display displaying a vehicle condition information image 50 and the map image.
Figure 3A:
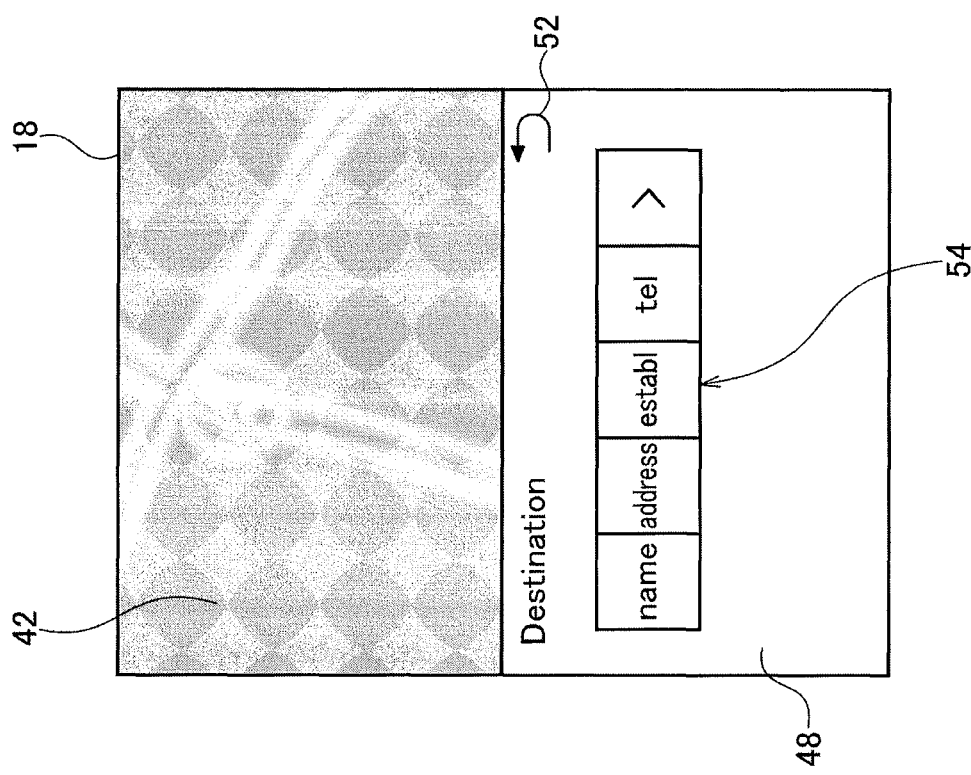
FIG. 3A shows the display displaying a destination setting image and a map image.

FIG. 3A shows the display 18 displaying a destination setting image 48 and the map image 42, and FIG. 3B shows the display 18 displaying a vehicle condition information image 50 and the map image 42.

FIG. 3A shows that the display 18 displays the destination setting image 48 and the blurred map image 42 one on top of the other, in response to the user's touch on the menu icon 46a shown in FIG. 2B and acknowledgement by the acknowledging unit 22 of an input to display a function item for setting a destination. The processor 32 receives the destination setting image 48 as an inserted image from the destination setting unit 26. The processor 32 merges the map image 42 and the destination setting image 48.

The processor 32 displays the map image 42 and the destination setting image 48 in substantially the identical size in such a manner as to split the display area of the display 18 into two areas. The processor 32 may clip the map image 42 shown in FIG. 2A for a merge. Alternatively, the processor 32 may reduce the map image 42 of FIG. 2A for a merge. The user uses setting icons 54 displayed in the destination setting image 48 so as to set a destination. When a destination has been set, the map image 42 in which route guidance information is inserted is displayed.

By causing the processor 32 to display the map image 42 in a blurred manner, the user can easily recognize the destination setting image 48 that is relatively clear and can concentrate on the setting image. When the user taps a return icon 52, the display of the destination setting image 48 is terminated and the processor 32 displays the map image 42 on the display 18 as shown in FIG. 2A.

Even when the map image 42 is displayed in a blurred manner, the map image 42 is updated and scrolled in accordance with the position of the driver's vehicle as the driver's vehicle moves during a travel. When the driver's vehicle moves, the map image 42 on the display 18 is scrolled with the driver's vehicle symbol 44 remaining displayed near the center of the display 18. This indicates to the user that the map display function remains in operation.

FIG. 3B shows that the display 18 displays the non-blurred map image 42 and the vehicle condition information image 50 one on top of the other, in response to the user's touch on the menu icon 46b shown in FIG. 2B and acknowledgement by the acknowledging unit 22 of an input to display a function item for displaying vehicle condition information. Vehicle condition information such as vehicle speed and travel time is shown in the vehicle condition information image 50.

The processor 32 receives the vehicle condition information image 50 as an inserted image from the vehicle condition provider 30. The processor 32 merges the map image 42 and the vehicle condition information image 50. The driver's vehicle symbol 44 is shown near the center of the map image 42. By causing the processor 32 not to blur the map image 42, the user can use both the map display function and the vehicle condition information display function.

As described above, the area on the display 18 is split to display the map display function and another function such that the processor 32 blurs the map image depending on the type of the other function. In this way, usability is improved. By not blurring the map image when the processor 32 displays a function other than the destination setting function in a split area, the user can make selections as needed and view respective functions.

Given above is an explanation based on exemplary embodiments. The embodiment is intended to be illustrative only and it will be obvious to those skilled in the art that various modifications to constituting elements and processes could be developed and that such modifications are also within the scope of the present disclosure.

The display 18 according to the embodiment is described as being provided in a vehicle. Alternatively, the display 18 may be a touch-sensitive panel display of a cellular phone terminal.

The destination setting image 48 according to the embodiment is described as being displayed in a split area of the display 18. Alternatively, the destination setting image 48 may be displayed in the entire area of the display 18. For example, a display change switch may be provided so that the user may use the display change switch to switch between displaying the destination setting image 48 in a split area and displaying it in the entire area. Further, interface images for the vehicle condition information image 50 or the communication unit 31 may be displayed in the entire area.

What is claimed is:

1. An image display device comprising:
 a display configured to display images; and
 a controller, the controller configured to function as:
  a processor that generates an image for display on the display;
  a map provider that provides a map image indicating a position of a driver's vehicle to the processor;
  an image provider that provides a display image associated with a type of a function item according to a user input; and
  an acknowledgement unit that acknowledges a user input from an input unit of the display, wherein
  the image provider provides the processor with a destination setting image for the user attempting to set a destination, the destination setting image including setting icons for setting the destination, and
  when the acknowledgement unit acknowledges an input from the user to display the function item, the processor causes the display to display the map image and the display image associated with the user input; and, thereafter, in response to an input from the user to display the function item for setting a destination, the acknowledgement unit acknowledges the input from the user to display the second function item, and the processor causes the display to display the destination setting image including the setting icons for setting the destination as the display image and causes the display to display the map image showing the position of a driver's vehicle in a blurred manner, and, otherwise, when the acknowledgement unit acknowledges an input from the user to display the function item for displaying vehicle condition information, the processor causes the display to display the display image and display the map image showing the position of the driver's vehicle without blurring the map image.

2. The image display device according to claim 1, wherein the processor determines whether a user input requires the map image to be blurred or not.

3. An image display device comprising:
a display configured to display images; and
a controller, the controller configured to:
  generate an image for display on the display;
  provide a map image;
  provide a display image associated with a type of a function item; and
  acknowledge a user input, wherein
  the controller provides a destination setting image for the user attempting to set a destination, the destination setting image including setting icons for setting the destination, and
  when the controller acknowledges an input from the user to display a first function item, the controller causes the display to display the map image and the display image associated with the user input; and, thereafter, in response to an input from the user to display a second function item, the controller acknowledges the input from the user to display the second function item, determines whether the second function item is a designated function item that requires blurring of the map image, and causes the display to display the second function item including the setting icons for setting the destination as the display image and display the map image in a blurred manner when the second function item is determined to be the designated function item, otherwise, the controller causes the display to display the second function item and display the map image without blurring the map image when the second function item is determined to not be the designated function item.

4. The image display device according to claim 3, wherein the user input is from an input unit of the display.

5. The image display device according to claim 1, wherein, when the processor causes the display to display the map image in a blurred manner, the processor blurs the map image by averaging pixel values of adjacent pixels in the map image without reducing the number of pixels in the map image.

6. The image display device according to claim 3, wherein, when the processor causes the display to display the map image in a blurred manner, the processor blurs the map image by averaging pixel values of adjacent pixels in the map image without reducing the number of pixels in the map image.

* * * * *